United States Patent Office 2,733,163
Patented Jan. 31, 1956

2,733,163

PROCESS OF FORMING LUMINESCENT SCREENS

Albert Steadman, Upper Montclair, N. J., assignor to Allen B. Du Mont Laboratories, Inc., Passaic, N. J., a corporation of Delaware No Drawing. Application June 21, 1949,
Serial No. 100,543

10 Claims. (Cl. 117—33.5)

The present invention relates to a process for depositing luminescent material on a solid surface in order to form a luminescent screen. More particularly, the present invention relates to a process in which a colloid is formed by mixing two colloid-forming components, one of which has luminescent particles dispersed therein, and then settling the luminescent particles from the colloidal solution upon the solid surface. This process assures a uniform layer of luminescent particles in which each particle is firmly bound or adhered to the underlying surface.

The invention disclosed herein is in general an improvement on the process disclosed in Tidik et al. Patent No. 2,451,590, issued October 19, 1948. In its commercial operation under that patent, the common assignee thereof and of this application has utilized a barium hydroxide-potassium waterglass gel and has also used an acetone-potassium waterglass gel. Both of these gels formed a satisfactory product and both were likewise satisfactory from a viewpoint of reliability and ease of handling. However, each process had certain disadvantages. In the case of the barium hydroxide waterglass gel, it was found that if the atmosphere in which the process of forming luminescent screens was found to contain substantial amounts of carbon dioxide, the barium hydroxide, because of its affinity for carbon dioxide, was converted to barium carbonate and as a result large agglomerations of barium carbonate settled from the colloidal solution and were deposited on the screen. These "clots" were impenetrable by the cathode rays and thus rendered the screens imperfect and unusable. The acetone-potassium waterglass gel, although preferable to the barium hydroxide, likewise had serious disadvantages, the chief one of which was the fact that acetone is highly flammable and that large quantities thereof had to be kept on hand. As a result, the fire hazard was such as to make the use of this gel in commercial operation dangerous and impractical.

It is an object of the present invention to provide a process for settling luminescent particles onto a surface in order to provide a screen for a cathode ray tube or the like in which the luminescent material is dispersed in a solution of one of the gel components and is subsequently, upon admixture with a solution of the second gel component, settled through the colloid thereby formed onto the screen.

It is another object of the invention to provide a process such as that mentioned above in which the results procurable by use of an acetone waterglass gel are secured while utilizing a gel having no acetone present therein.

It is a further object of the invention to provide a gel, neither component of which will react with air gases, such as carbon dioxide, to deleteriously affect the resultant screen.

It is a still further object of the invention to provide a process such as mentioned above in which the time necessary to perform the process is considerably reduced in comparison to similar processes without corresponding reduction in the quality of the product.

Other objects and features of the invention will become apparent to those skilled in the art when the following description is considered, the scope of my invention however, being specifically set forth in the appended claims. In the practice of the present invention, an aqueous solution of an alkali earth organic salt such as barium acetate is brought into contact with the surface on which a luminescent screen is to be formed. Thereafter, there is added to this solution an aqueous solution of potassium waterglass in which luminescent material is dispersed. The two materials, i. e., the potassium waterglass and the alkali earth organic salt, form a colloidal solution and the luminescent material settles therethrough and is deposited upon the surface. It may be assumed that the function of the alkaline earth metal salt is to provide positive ions which react with the potassium waterglass to form the corresponding silicate and it is this silicate, or the precursor of the silicate, which forms an adhesive for the luminescent material, which adhesive is considered to be in colloidal form. Upon the completion of settling, the excess solution is decanted and the screen is then dried, normally by passing over it an air current at a temperature of approximately 60° C. It is to be realized that the reverse procedure, i. e., adding the luminescent material to the solution of barium acetate and then mixing with a solution of potassium waterglass, may equally as well be practiced in accordance with this invention.

In the case of a cathode ray tube blank the solutions or materials are poured into the blank. Obviously, in some other circumstances, where the screen is to be formed of a surface which is not itself part of the container, it will be necessary to provide a cylinder or the like resting on the flat surface in order to form a container for the material.

Examples of the alkali earth organic salts mentioned as usable are barium acetate, barium formate, barium lactate and barium benzoate. Salts of alkali earth metals other than barium may be utilized but the barium salts are preferable because of their generally lower cost and greater availability. The degree of water solubility necessary for the alkaline earth metal salt is simply that which is sufficient to put enough alkaline earth metal ions in solution to bring about the formation of the colloidal adhesive or alkaline earth metal silicate which functions as the adhesive. The alkali earth organic salt found to afford the optimum screen formation in the shortest time through its use as the gel component is barium acetate.

Tests have shown that by the use of a gel comprising barium acetate and potassium waterglass a "wet strength" of the settled screen is provided which permits decantation of the settling medium within a lesser time than was possible with the acetone waterglass gel and that additionally it is possible to perform the decantation operation in a shorter time. Thus, if a 12" cathode ray tube is considered, it is possible to initiate the decanting operation in from ten to twelve minutes, after the gel is first formed in the tube blank, whereas with the acetone potassium waterglass gel, fifteen minutes was required.

Likewise, considering a 12" tube as a basis for comparison, by the use of the present gel solution, decantation may be completed in from five to six minutes, whereas the acetone gel required a time of from seven to eight minutes.

As is well known in the art, barium acetate when heated to temperatures around 350° C. will be converted to barium carbonate and acetone. In the usual further processing of cathode ray tubes, heating to temperatures in this neighborhood is employed; therefore, any barium acetate remaining in the screen layer which does not exist in the colloidal form will be converted to barium carbonate and acetone. Any residual barium acetate, not present as a colloidal constituent, is prone to produce gaseous vapors in use and thus damage the tube. Since barium carbonate does not produce gaseous vapors, i. e., barium carbonate is involatile at the baking temperature, the desirability of such a reaction is clearly seen. Moreover, since the acetone volatilizes, its removal is readily affected.

At first glance, it would seem that the present process would be open to the same objections as that in which the barium hydroxide-potassium waterglass gel is utilized. This, however, is not the case, since the possibility of there being any large amounts of barium acetate which have not reacted to form the colloid is very slight.

In view of this, the small amounts of barium acetate which do not comprise the colloid, produce a corresponding small amount of barium carbonate interspersed in the screen layer. Since in the present process, the particles are uniformly deposited on the surface and are uniformly coated with barium acetate, there is a uniform and very thin distribution of this barium carbonate, leaving the screen readily penetrable by the cathode ray beam. Furthermore, the quantities of acetone, given off during the baking or heating process, are so small that there exists no fire hazard as present when large drums of acetone, necessary in the practice of the acetone potassium waterglass method, mentioned above, are used.

In order that this invention may readily be practiced, there are given below a number of specific examples of the concentrations, quantities, and times for performing the various steps of the process:

*Example 1*

The following procedure applies to the formation of a luminescent screen on a cathode ray tube having a tube face diameter of 3": 150 cc. of an aqueous solution of barium acetate at Solu-Bridge reading of 7 corresponding to a concentration of 370–375 parts per million, is introduced into a cathode ray tube blank. A solution of 10 cc. of 10.5° Bé. potassium waterglass in 50 cc. distilled water in which .35 gram of luminescent screen material is dispersed is added to the barium acetate solution. The screen material is allowed to settle 12 minutes at which time the excess colloidal solution or adhesive is decanted in a period of 5 to 6 minutes. The tube is then dried by passing over it an air current at 60° C.

*Example 2*

The following procedure applies to the formation of a luminescent screen on a cathode ray tube having a tube face diameter of 5": 300 cc. of an aqueous solution of barium acetate at Solu-Bridge reading of 10 corresponding to a concentration of 520–540 parts per million, is introduced into a cathode ray tube blank. A solution of 20–30 cc. of 10.5° Bé. potassium waterglass and 50 cc. distilled water in which is dispersed .75 gram of luminescent material is added to the barium acetate solution. The luminescent material is allowed to settle for 12 minutes, at which time the excess colloidal solution or adhesive is decanted in a period of from 5–6 minutes and the screen is dried by passing over it an air current at 60° C.

*Example 3*

The following procedure applies to the formation of a luminescent screen on a cathode ray tube having a tube face diameter of 12": 4 liters (±150 cc.) of an aqueous solution of barium acetate at Solu-Bridge reading of 4.5–5.2, corresponding to a concentration of 212–275 parts per million, is introduced into a cathode ray tube blank. A solution of 100 cc. of 10.7–11.2° Bé. potassium waterglass in 100 cc. of distilled water in which is dispersed 3.3 grams of luminescent material is added to the barium acetate solution. The screen material is allowed to settle 12 minutes at which time the excess colloidal solution or adhesive is decanted in a period of 5 minutes and the screen is then dried by passing over it an air current at 60° C.

*Example 4*

The following procedure applies to the formation of a luminescent screen on a cathode ray tube having a tube face diameter of 20": 14 liters of an aqueous solution of barium acetate at Solu-Bridge reading of 4.5–5.2 is introduced into a cathode ray tube blank. A solution of 425–475 cc. of potassium waterglass of 10.7°–11.2° Bé. and 150–200 cc. of distilled water in which are dispersed 13 grams of luminescent material is added to the barium acetate solution. The screen material is allowed to settle 20–23 minutes and then the excess colloidal solution or adhesive is decanted as rapidly as possible while maintaining an even flow of liquid out of the tube. The screen is then dried by passing over it an air current at 60° C.

The Solu-Bridge is a conductivity measuring control instrument made by the Industrial Instrument Company of Verona, New Jersey, and sold under that trademark.

As the above examples show, the concentrations, quantities and times for performing the various steps in this process will vary in accordance with the size of the tube face upon which the screen is to be deposited, the shape of the tube, the size of the luminescent particles to be deposited on the tube, the volume of solution used, and other factors.

In order to form screens of optimum utility, it has been found that a sufficient total volume of solution should be used in order to give a minimum depth of from 3–4 cm. In the case of a tube with a 3" screen face, a normal volume of total solution to give a depth of 4–5 cm. should be employed. Likewise, where the tube screen face is 12" and 20", the normal depths should be 7–8 cm. and 12–15 cm., respectively.

When luminescent screens are applied to tube faces wherein the tube is flared, it is found that the greater the flare, the correspondingly smaller volume of total solution required, in accordance with the practice of this process.

Variance in size of the luminescent particles will necessitate corresponding changes in the concentration of the gel components, in order to change the time required for gel formation so that the luminescent particles settle through the desired depth of colloidal solution. Since smaller luminescent particles will settle through the gel in a longer period of time due to a Brownian like movement of the particles than larger particles, it is necessary to delay the gel formation, as for instance by decreasing the barium acetate concentration to levels even more dilute than those given in the specific examples, thus affording less opportunity for the barium acetate to react with the potassium waterglass. Conversely, when larger particles of luminescent material are used, since their rate of falling through the colloidal gel is greater than that of smaller particles, similarly due to a Brownian like movment, the gel formation is accelerated, as for instance by increasing the barium acetate concentration, thus providing more barium acetate to react with the potassium waterglass to form the gel, thereby allowing the luminescent particles to settle through the desired depth of colloidal solution The function of the two reactants potassium waterglass and the alkaline earth metal organic salt is to induce adhesion of the luminescent particles to the faceplate of the cathode ray tube and, although the mechanism is not completely clear, it is useful to consider it as one involving the formation of a colloidal silica gel or adhesive through a reaction leading ultimately to the formation of the alkaline earth metal silicate.

In addition, it should be noted that whenever a decrease in the total volume of solution used is necessitated, for any of the above stated reasons, the concentrations should be such that the formation of the colloid is favored.

While I have described a preferred embodiment of my invention, it will be understood that modifications thereof may be utilized within the scope and spirit of my invention. Consequently, I wish to be limited not by the foregoing description, but, on the contrary, solely by the claims granted to me.

What is claimed is:

1. The process of forming a luminescent screen on the face of a cathode ray tube blank which comprises the steps of forming a solution of material selected from the group consisting of barium acetate, barium lactate, barium formate, and barium benzoate, introducing said solution into said blank, forming a potassium water glass solution, dispersing a pulverulent luminescent material into said potassium water glass solution, introducing said potassium water glass solution with said dispersed pulverulent luminescent material into said blank to form a colloid adhesive therein, settling said luminescent material through said colloid adhesive and onto the face of said blank, removing excess solution from said blank and thereafter heating to remove moisture from the material deposited on the face of said blank.

2. The process of forming a luminescent screen on the face of a cathode ray tube blank which comprises the steps of forming a solution of barium acetate, introducing said solution into said blank, forming a potassium water glass solution, dispersing a pulverulent luminescent material in said water glass solution, introducing said water glass solution with said dispersed luminescent material into said blank to form a colloid adhesive therein, settling said luminescent material through said colloid adhesive onto the face of said blank, decanting excess solution from said blank and thereafter heating the material deposited on said face to a temperature of about 60° C. to remove moisture therefrom.

3. The process of forming a luminescent screen on the face of a cathode ray tube blank which comprises providing a solution of water-soluble alkaline earth metal salt of an organic acid which will leave an involatile residue following the final baking temperature used in finishing the cathode ray tube, said salt having a water solubility greater than the corresponding alkaline earth metal silicate, the method including further providing a potassium waterglass solution, dispersing in one of said solutions finely divided luminescent particles, introducing said solutions into said blank to form a colloid adhesive therein, allowing said luminescent particles to settle through said colloid adhesive and onto the face of said blank, removing excess solution from said blank and thereafter heating the coated surface to remove moisture from the deposit formed on the said surface.

4. The method in accordance with claim 3, in which the alkaline earth metal is barium.

5. The process of forming a luminescent screen on the face of a cathode ray tube blank which comprises providing a solution of a material selected from the group consisting of barium acetate, barium lactate, barium formate and barium benzoate, providing a potassium water glass solution, dispersing in one of said solutions finely divided luminescent particles, introducing said solutions into said blank to form a colloid adhesive therein, allowing said luminescent particles to settle through said colloid adhesive and onto the face of said blank, removing excess solution from said blank and thereafter heating the coated surface to remove moisture from the deposit formed on said surface.

6. The process in accordance with claim 5, in which the barium salt is barium acetate.

7. The process in accordance with claim 5, in which the barium salt is barium lactate.

8. The process in accordance with claim 5, in which the barium salt is barium formate.

9. The process in accordance with claim 5, in which the barium salt is barium benzoate.

10. The process of forming a luminescent screen on the face of a cathode ray tube blank which comprises the steps of forming a solution of barium acetate, introducing said solution into said blank, forming a potassium waterglass solution, dispersing a pulverulent luminescent material in said waterglass solution, introducing said waterglass solution with said dispersed luminescent material into said blank, settling said luminescent material onto the face of said blank and decanting excess solution from said blank.

References Cited in the file of this patent

UNITED STATES PATENTS

| | | |
|---|---|---|
| 2,108,683 | Leverenz | Feb. 15, 1938 |
| 2,373,198 | Roehrick | Apr. 10, 1945 |
| 2,412,654 | Sadowsky | Dec. 17, 1946 |
| 2,451,590 | Tidik et al. | Oct. 19, 1948 |
| 2,487,097 | Byler | Nov. 8, 1949 |
| 2,684,306 | Brewer et al. | July 20, 1954 |